Dec. 24, 1968   J. C. O'BRIEN ET AL   3,417,856
METHOD OF AND APPARATUS FOR ORIENTING SMALL ARTICLES
Filed Aug. 9, 1966   4 Sheets-Sheet 1

INVENTORS
JOHN C. O'BRIEN
WILLIAM H. COX
BY
Morgan, Finnegan, Durham & Pine
ATTORNEYS.

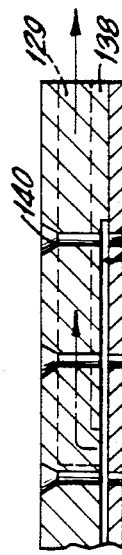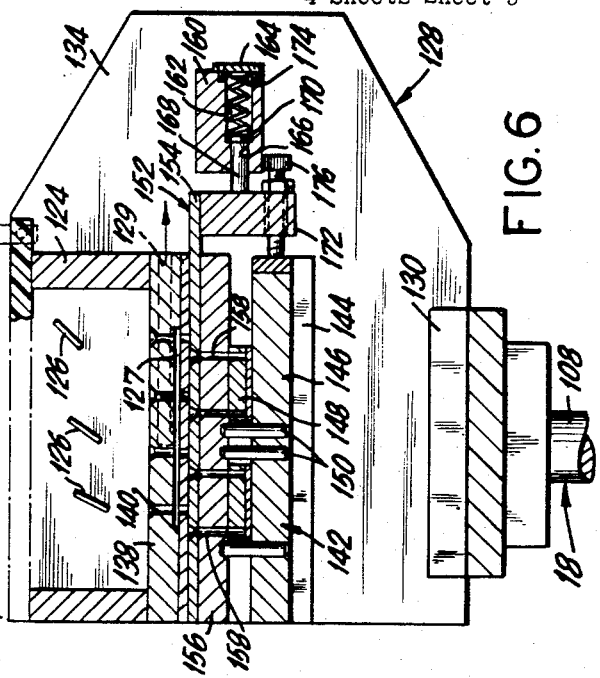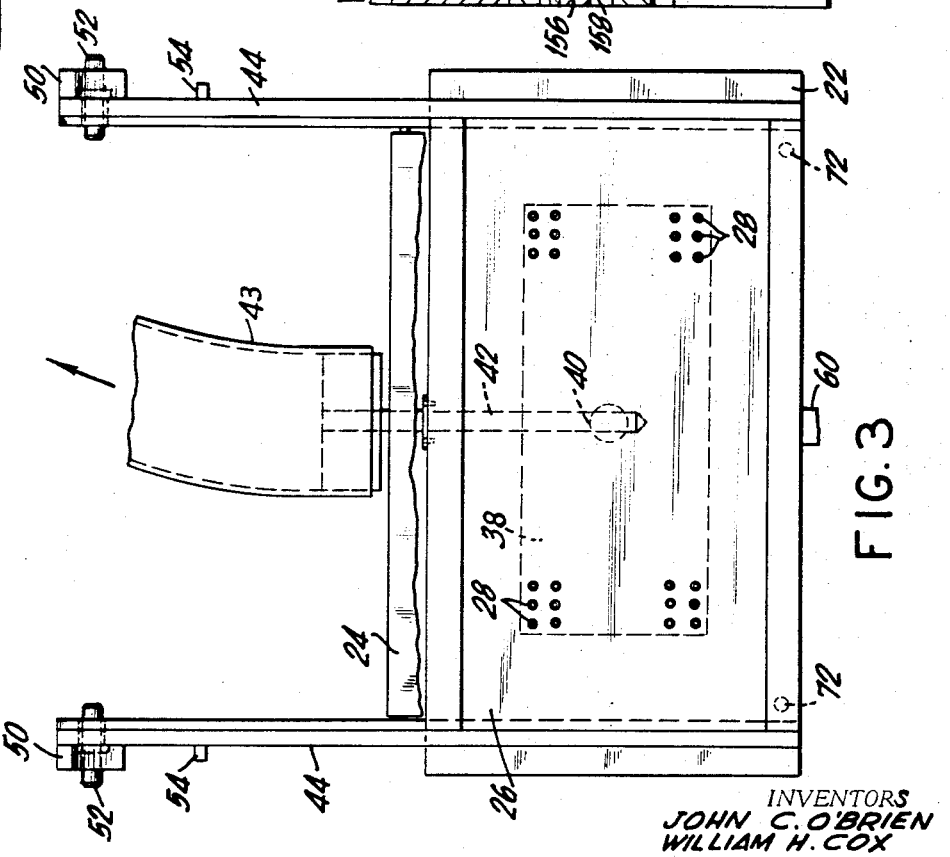

INVENTORS
JOHN C. O'BRIEN
WILLIAM H. COX
BY
Morgan, Finnegan, Durham & Pine
ATTORNEYS.

United States Patent Office 3,417,856
Patented Dec. 24, 1968

3,417,856
METHOD OF AND APPARATUS FOR
ORIENTING SMALL ARTICLES
John C. O'Brien, 88 Netherwood Ave., North Plainfield,
N.J. 07060, and William H. Cox, 10 White Birch
Ave., Pompton Plains, N.J. 07444
Filed Aug. 9, 1966, Ser. No. 571,280
12 Claims. (Cl. 198—33)

ABSTRACT OF THE DISCLOSURE

Automatic orientation of a number of relatively small randomly positioned articles, such as metal inserts for molded parts. The articles are randomly positioned in a confined area over a plurality of orifices for receiving the articles, such as a container having a bottom with a plurality of orifices therethrough arranged in the desired pattern for said inserts. The container is rapidly reciprocated to cause the articles to freely move up and down and over said container orifices without hindering the movement of one another. Simultaneously a flow of fluid is maintained through the orifices to induce the freely moving articles to enter into the same. In one embodiment of the invention, a carrier is placed directly beneath the container orifices before the operation begins so that the articles after entering the container orifices immediately pass into aligned orifices within the carrier. In another embodiment of the invention a movable transfer plate is provided directly beneath the orifices in the container which prevents the inadvertent removal of the inserts from the container orifices but which allows the inserts to pass into a carrier after they have been oriented in the container orifices.

---

This invention relates to a method of and apparatus for orienting relatively small articles and more particularly to orienting inserts for plastic parts.

In forming many products there is often a need to quickly and efficiently gather and orient a number of relatively small articles. An example of this is found in gathering and orienting metal inserts for molded parts, such as terminals .047 inch in diameter and 1.5 inches in length. Generally, several molded parts are formed simultaneously and several inserts are required for each part. The arranging of several inserts for each part has been commonly done by loading a carrier by hand and thereafter transferring the inserts to the molded parts. This manual work is tedious and difficult to perform at a satisfactory rate.

Attempts to automate this process have been generally unsatisfactory. In one process, for example, randomly distributed relatively small articles are tumbled past a number of openings for receiving and retaining said articles. In tumbling, however, the articles remain in contact with one another so as to adversely influence and hinder their movement into the openings. Tumbling of the articles also tends to cause them to roll over the openings rather than going thereinto. In such process, moreover, the carrier for the articles is not positioned underneath the openings until the articles are oriented. Because exact alignment is difficult, at least some oriented articles often fall to the floor instead of being transferred to the carrier. The missing articles must then be replaced by hand which is exactly what the process is trying to obviate.

It is therefore one object of this invention to provide a new and improved method of and apparatus for orienting a number of randomly distributed relatively small articles.

It is another object of the invention to provide a method of and an apparatus for simultaneously orienting randomly distributed relatively small articles in several groups.

It is still another object of the invention to simultaneously orient randomly distributed relatively small inserts for several parts, such as terminals for several plastic molded parts.

It is another object of the invention to automatically transfer all the oriented articles to a carrier in a single step without losing any of them.

In accordance with the present invention, a number of relatively small articles are oriented by randomly filling a confined area with said articles wherein said area is positioned over a plurality of orifices for receiving and retaining said articles, rapidly reciprocating said randomly distributed articles over said orifices so that said articles freely move up and down within the confined area without hindering the movement of one another, and simultaneously maintaining a flow of fluid through the orifices to induce the freely moving articles to enter into the same. Preferably the fluid is air and a pressure differential is maintained across the orifices by withdrawing air from the area directly beneath the orifices, to thereby create a sucking action through said orifices that induces the articles to enter the same. To further facilitate the orienting of the articles, the same amount of air is preferably withdrawn from the area directly beneath the orifices throughout the operation. Thus, as the orifices become filled with the articles, the sucking action through the unoccupied orifices increases to thereby further induce the freely moving articles to enter the unoccupied orifices.

In one embodiment of the invention there is provided an automatic loading device adapted to simultaneously orient randomly positioned inserts for several molded parts, comprising a container having an interior into which the inserts are randomly loaded, means having a plurality of orifices for receiving and retaining said inserts from within said container and wherein said orifices are arranged to correspond to the desired position of the inserts for the several molded parts, reciprocating means operatively connected to said container for freely moving said articles up and down in said container and over said orifices without hindering the movement of one another, and vacuum means for creating a pressure differential across said receiving and retaining means wherein the pressure of said container above said receiving and retaining means is greater than the pressure therebelow, to thereby create a sucking action through said orifices of said receiving and retaining means to quickly and efficiently induce the freely moving inserts to enter the same.

According to one embodiment of the invention, a carrier is placed directly beneath the container before the operation begins so that the articles after entering the orifices immediately pass into aligned orifices within the carrier. In another embodiment of the invention a transfer plate is provided directly beneath the orifices in the container to prevent the articles within the orifices from inadvertently falling but which is movable, however, to allow the articles to properly pass into the carrier. In either embodiment the articles are transferred to a carrier without incident, and thereafter the articles are, in turn, transferred to the molded parts without having to handle several replacement articles by hand.

Other objects and advantages of the invention are set forth in part herein and in part will be obvious herefrom, or may be learned by the practice with the invention, the same being realized and attained by means of the instruments and combinations pointed out in the appended claims.

FIGURE 3 is a plan view of FIGURE 1;

FIGURE 6 is a sectional view of FIGURE 4 taken along the lines 6—6 thereof; and

FIGURE 7 is an enlarged detailed sectional view of a portion of the container of said other embodiment of the invention.

Figure 1:
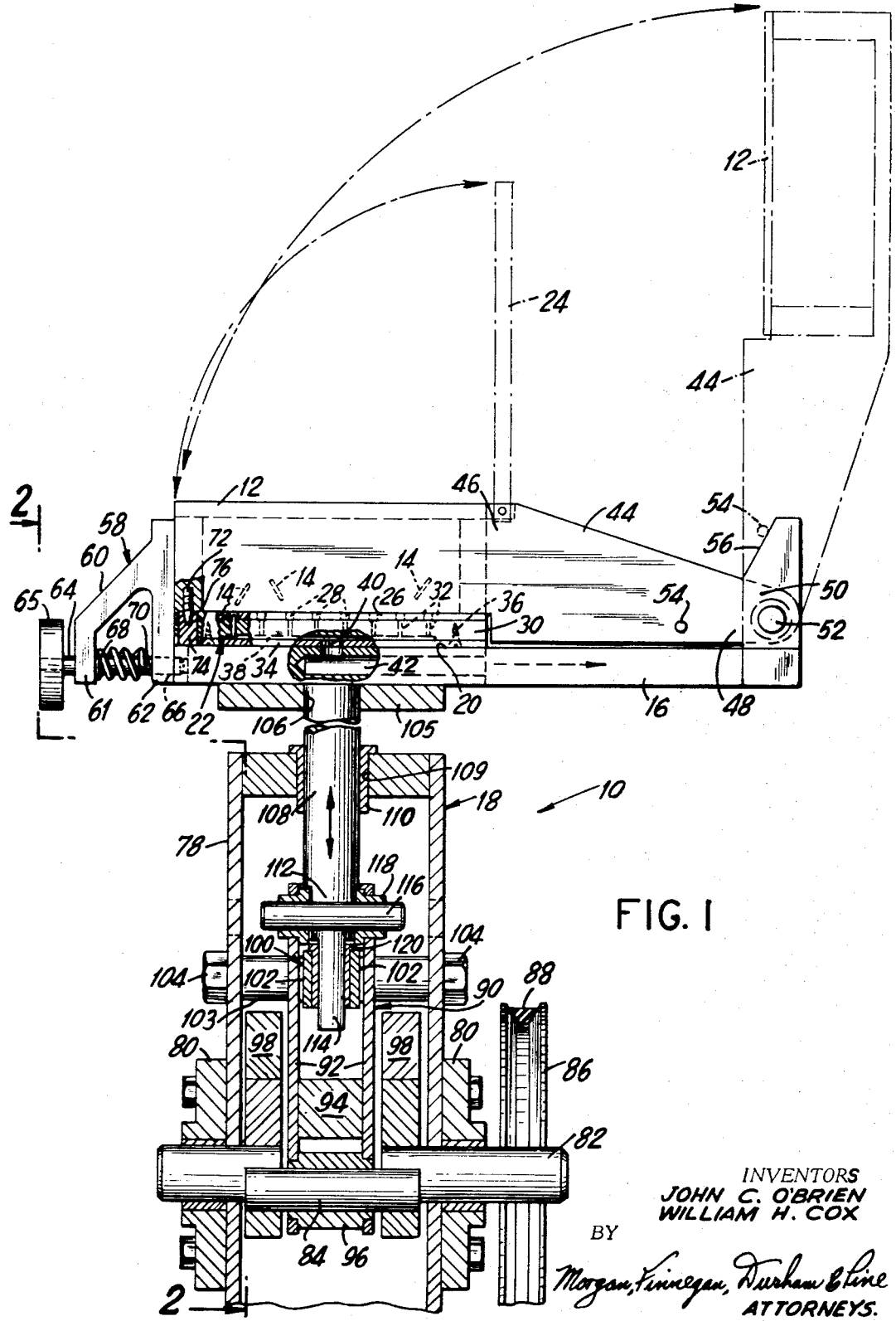
FIGURE 1 is a side elevational view, partly in section, of one embodiment of the invention.
Figure 2:
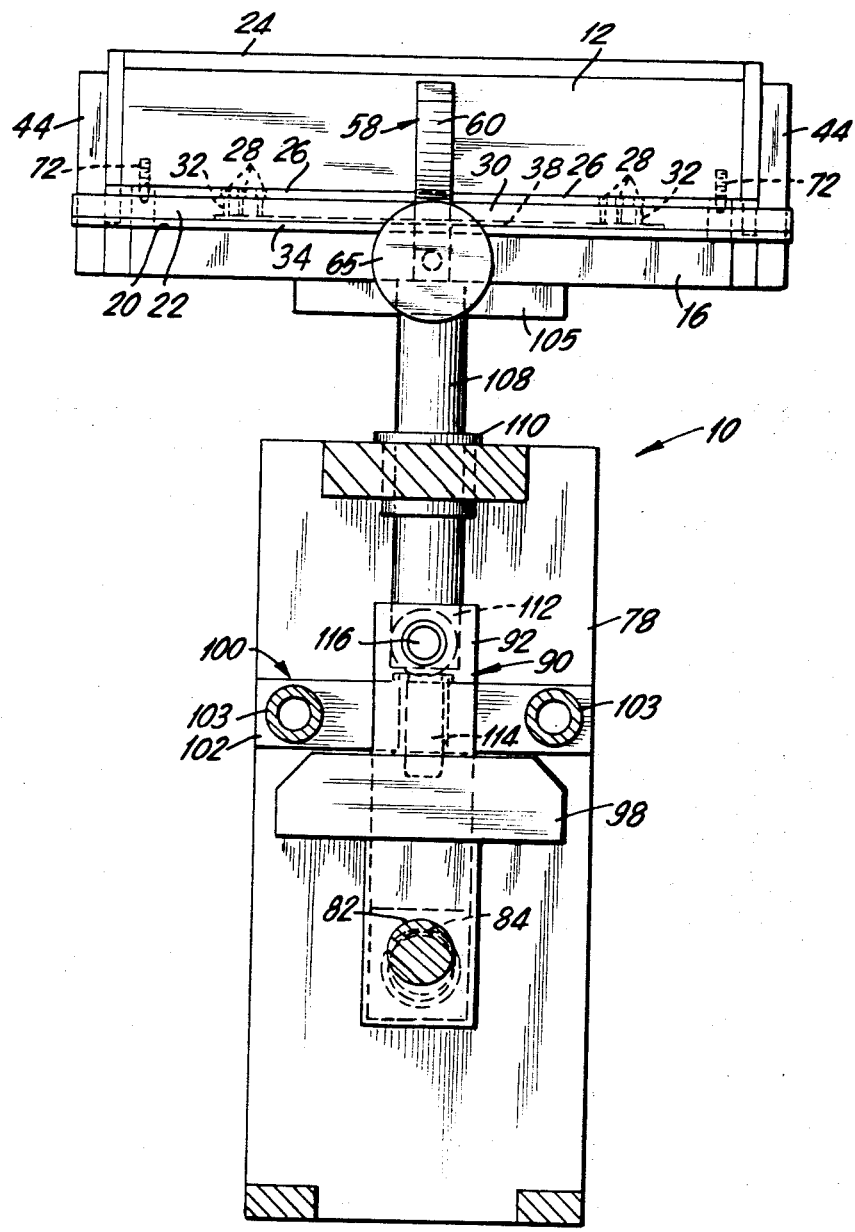
FIGURE 2 is a sectional view of FIGURE 1 taken along the lines 2—2 thereof.

Referring to the drawings and first to FIGURES 1–3, there is shown one embodiment of the automatic loading device for gathering and orienting small articles, generally designated by the reference character 10.

The device 10 includes a container 12 for the articles to be oriented, such as metal inserts 14 for plastic parts, that is pivotally mounted to and spaced over the front portion of a horizontally positioned platform 16 supported by a drive 18 for the device 10. The space between the platform 16 and container 12 forms a recess 20 at the front portion of the platform 16 for a carrier 22 that receives and retains the inserts 14 from the container 12.

With respect to the container 12, it includes a lid 24 pivotally connected thereto that is made of a transparent material, such as plexiglass, so that the inserts 14 can be viewed during operation. Extending through the bottom 26 of the container 12 are a plurality of orifices 28 for the passage of inserts 14 into the carrier 22.

The carrier 22 includes a plate 30 having a plurality of orifices 32 therethrough for receiving the inserts 14 and an imperforate base 34 secured to the bottom of the plate 30 as by screws 36 for retaining the inserts 14 received by the carrier 22. The number of carrier orifices 32 correspond to the orifices 28 in the container 12 and both are arranged in groups wherein each group corresponds to the pattern for the inserts 14 within one molded part.

When the carrier 22 has been inserted into recess 20 the carrier orifices 32 and container orifices 28 are in alignment so that the orifices 32 communicate at one end thereof with interior of the container 12. At the other end the carrier orifices 32 communicate with a recess 38 formed between the carrier plate 30 and base 34. As shown in FIGURE 3 the perimeter of the recess 34 is adjacent to the outermost orifices 32 in the carrier 22. The carrier recess 38 is used in creating a pressure differential across the carrier orifices 32. To this end the carrier base 34 includes a bore 40 therethrough communicating at one end with the central portion of the recess 38 and communicating at the other end with a conduit 42 in the platform 16. As shown in FIGURE 3, the conduit 42 is, in turn, connected to a conduit 43 of a vacuum machine (not shown) for effectuating said pressure differential. Such vacuum machine can be any one of a number of standard machines which can continually withdraw air from the recess 38 such as about 300 cubic feet per minute, and create a pressure differential across the carrier orifices 32, such as a pressure differential of about 5 inches of mercury.

As shown in FIGURE 1 the inserts 14 received and retained by the carrier orifices 32 extend into the container orifices 28. To allow the container 12 to be lifted from the carrier 22 after it has been fully loaded without having the container 12 striking the inserts 14, the breadth of the container orifices 28 is slightly greater than the breadth of the inserts 14 to provide a loose fit therebetween. For retaining the inserts 14 within carrier orifices 32 during the operating cycle, however, the breadth of said orifices 32 is about equal to the breadth of the inserts 14 to provide a sliding fit therebetween. In this manner the sucking action of the air maintains the inserts 14 in the orifices 32.

For pivotally mounting the container 12 to the platform 16 there is provided a pair of spaced tapered arms 44 that are connected at their bases 46 to either end of the container 12, and at the reduced portion 48 to a pair of uprights 50 secured to either end of said platform 16, as shown in FIGURES 1 and 3. Each pivotal connection between the arms 44 and the uprights 50 includes bores 52 and 54 through the adjacent arm 44 and upright 50, respectively, and a connecting pin 52 which extends through said bores 52 and 54. To limit the upward pivotal movement of the container 12 as it is swung upwardly from the platform 16, each arm 44 includes a stop 54 for abutting against the upper portion 56 of the upright 50 above the pivotal connection therebetween. As shown in FIGURE 1, the upper portion 56 of each arm 44 is inclined away from the front of the platform 16 so that the container 12 can rest against said upright 50 without inadvertently closing.

During operation the container 12 and the carrier 22 are secured to the platform 16 by a locking device 58 that includes a yoke 60 secured to the front of the container 12. The yoke 60 has a pair of downwardly extending legs 61 and 62 through which extends a spring actuated pin 64 having a knob 65 secured to the pin end extending from the leg 61. The other end of the pin 64 is releasably insertable into a bore 66 in the platform 16 when the container 12 is in the closed position as shown in FIGURE 1. Between the legs 61 and 62 is a helical spring 68 that encircles the pin 64 and constantly urges the pin 64 into the platform bore 66 by having the forward end of the spring 68 abutting the yoke leg 61 and by having the rearward end of the spring 68 abutting a stop 70 on said pin 64. The container 12 is lifted from the platform 16 by pulling the knob 65 outwardly until the pin 64 comes free of the bore 66. Thereafter the container 12 is lifted from the platform 16 until the stops 54 on the arms 44 engage the rearwardly inclined portion 56 of the uprights 50.

For proper alignment between the orifices 28 in the container 12 and the orifices 32 in the carrier 22 there is provided a pair of spaced tapered pins 72 depending from each forward end of the container 12. The carrier 22 includes correspondingly spaced openings in which are seated bushings 74 having tapered recesses 76 for receiving the tapered pins 72. In practicing the invention the carrier 22 is positioned on the front portion of the platform 16 and the container 12 containing the inserts 14 is then swung down over the carrier 22 whereupon the pins slide into the recesses 76 to thereby insure proper alignment between the container orifices 28 and the carrier orifices 32. Thereafter the knob 65 is released so that the pin 64 will slide into the bore 66 in the platform 16, to thereby lock the container 12 and carrier 22 on said platform 16.

The drive 18 for the container 12 includes a housing 78 having a bearing member 80 secured to each side of its lower portion. Extending through the housing 78 and the bearing members 80 is a rotatable shaft 82 having an offset portion 84 within the housing 78. For rotation of the shaft 82 a belt drive is provided that includes a pulley 86 secured to one end of the shaft 82, a standard electric motor (not shown), and an interconnecting belt 88 which frictionally engages the pulley 86 for rotating the shaft 82. Secured to the shaft offset 84 is a connecting rod 90 including a pair of spaced legs 92 and a spacer member 94 therefor secured between said legs 92. The lower portion of the connecting rod 90 rotates with the shaft offset 84 and to limit wear a cylindrical bushing 96 is provided between the connection of the rod 90 and shaft offset 84. Within the housing 78 and secured to the shaft 82 at each side of the connecting rod 90 is a pair of weights 98. The connecting rod 92 extends upwardly from the shaft offset 84 between the weights 98 to the upper portion of the housing 78. Between the legs 92 at the upper portions thereof is a guide member 100 having a pair of spaced lateral members 102 which extend beyond the connecting rod 90 at both ends thereof. For securing the guide members in spaced relationship there is provided a pair of bolts 103 and nuts 104 on each side of the rod 90.

Welded to the bottom of the platform 16 is a support member 105 having a bore 106 therethrough for receiving a reciprocating shaft 108 that is secured to the platform 16. The reciprocating shaft 108 depends from the support member 105 and extends into the housing 78 through a bore 109 provided with a wearing sleeve 110. The lower portion of the shaft 108 has two step down segments 112 and 114 both of which extend between the legs 92 of the connecting rod 90 and wherein the lower segment 114 reciprocally extends through the guide member 100. For reciprocation of the shaft 108 there is provided a pin 116 which extends through and pivotally connects the upper portion of the connecting rod 90 and the segment 112 of the shaft 108. To limit wear as the shaft 108 reciprocates there is provided a bushing 118 between the connecting rod pin 116 and the segment 112, and a bushing 120 between the guide member 100 and reciprocating lower segment 114.

In operation the container 12 if lifted from the platform 16 and the carrier 22 is positioned on the front portion of the platform 16. The container 12 is then swung down onto the carrier 22. In so doing the alignment pins 72 of the container 12 enter the tapered recesses 76 in the carrier 22 to insure proper alignment between the container orifices 28 and the carrier orifices 32. By securing the carrier 22 to the container 12 at the outset of the operation the oriented inserts 26 will pass through the container orifices 28 into the carrier orifices 32 without incident. With such proper alignment the spring actuated pin 64 extending through the yoke 60 is then released so that it extends into the bore 66 in the platform 16. As required inserts 26 are added to the interior of the container 12 by simply lifting the lid 24 and randomly placing the inserts 26 in the container 12.

Thereafter the drive 18 rapidly reciprocates the container 12 to cause the inserts 26 therein to freely fly up and down without hindering one another. At the same time the vacuum machine is actuated and withdraws a constant quantity of air from the recess 34 to thereby create sucking action through the carrier orifices 32 that induces the freely moving inserts to pass through the container orifices 28 and into the carrier orifices 32. As the carrier orifices 32 are filled the sucking action maintains the inserts 26 therein, and the increased sucking action through the unoccupied orifices serves as a further inducement for the remaining freely moving inserts 26. After the carrier 22 is fully loaded in a matter of seconds the vacuum machine and drive 18 are stopped and the container 12 is lifted from the platform 16 so that the carrier can be moved to the several molded parts and the inserts 26 transferred thereto.

In a specific example of this embodiment of the invention the container orifices 28 and carrier orifices 32 were divided into groups of eight and there were eight such groups to correspond to the terminal requirements of eight molded parts. Metal terminals $\frac{1}{32}$ inch square by $\frac{1}{2}$ inch long were used and loaded in a container 12 six inches by ten inches. The drive shaft 108 reciprocated the container 12 and carrier 22½ inches at the rate of 200 times per minute. Air was withdrawn from the recess 34 at the rate of about 300 cubic feet per minute and the pressure differential across the carrier orifices 32 was about 5 inches of mercury. Within seconds the carrier was almost filled with the terminals and the entire loading cycle only had to be continued for about twenty seconds. Thereafter the fully loaded carrier 22 was removed from the platform 16 and the terminal was inserted into the molded parts.

In the embodiment of the automatic loading device shown in FIGURES 4–7 there is provided a container 124 for inserts 126 which is supported by a frame 128 that includes a base 130 and a pair of side plates 134 extending upwardly from the base 130. Connected to the frame base 130 is the shaft 108 of the previously described drive 18.

Figure 4:
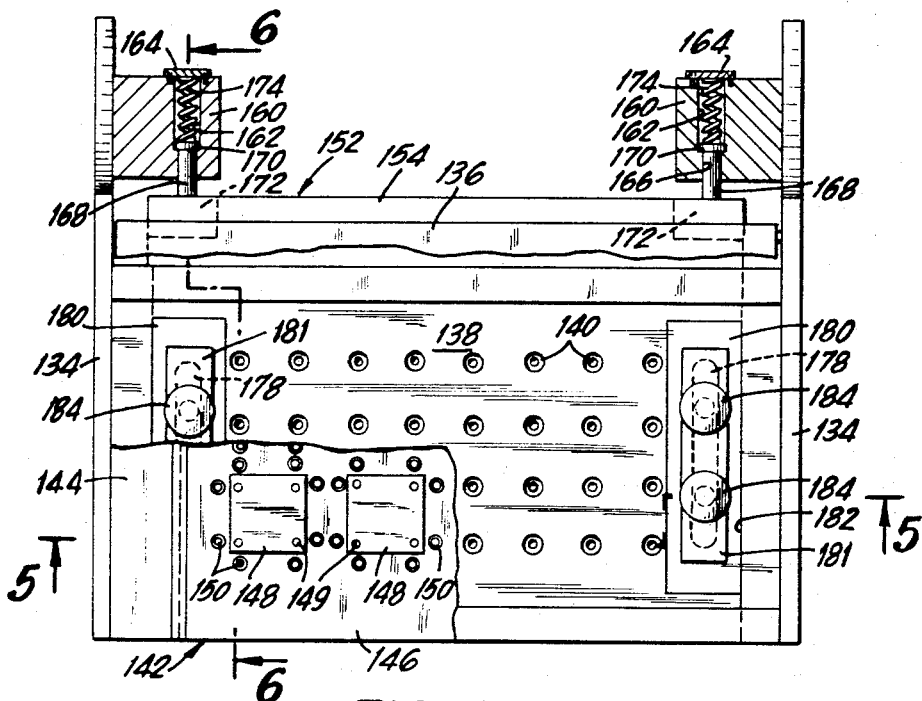
FIGURE 4 is a plan view partly in section and partly broken away for illustrating another embodiment of the invention.
Figure 5:
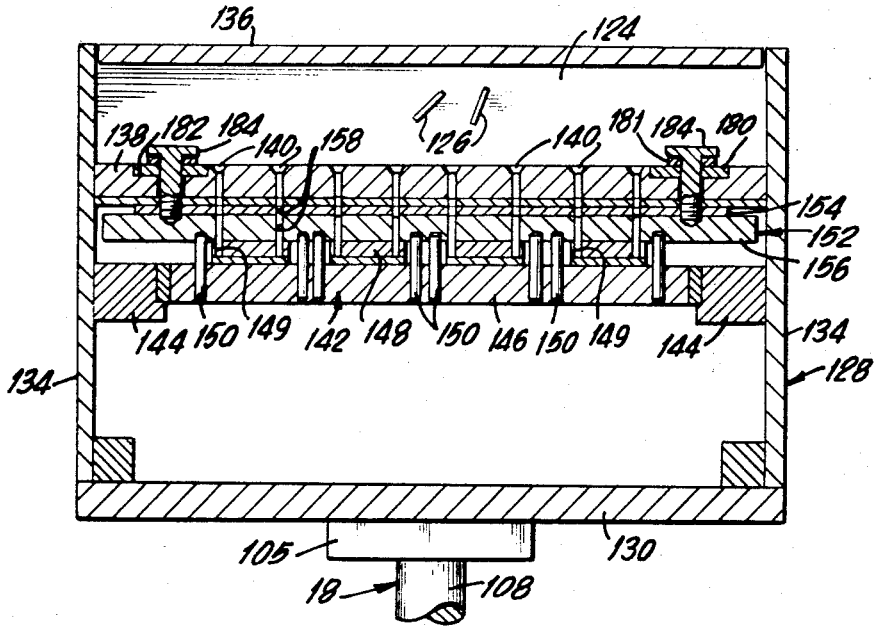
FIGURE 5 is a sectional view of FIGURE 4 taken along the lines 5—5 thereof.

The container 124 is positioned between the side plates 134 at the upper and forward portions thereof, and includes a lid 136 pivotally connected to the side plates 134 and a bottom 138 having a plurality of orifices 140 therethrough for the passage of inserts 126. As shown in FIGURE 4, there are thirty-two orifices arranged in groups of four, for eight molded parts (not shown). The sides of the container 124 are formed from the portions of the side plates 134 between the lid 136 and the bottom 138 of the container 124. In this embodiment of the invention the inserts 126 are first received and retained by the orifices 140 in the container 124.

As in the previous embodiment of the invention, the inserts 126 are induced into the container orifices 140 by creating a pressure differential thereacross. For this purpose, and as shown in FIGURE 7, the container bottom 138 includes a recess 127 therein communicating at one end with the interior of the container 124 through the orifices 140 and at the other end with a passage 129 in the container 124 open at one end to the central portion of the recess. As previously described the passageway 129 is connected at its other end to an external conduit which, in turn, is connected to a standard vacuum machine (not shown).

After the inserts 126 have been induced into the orifices 140 they are transferred to a carrier 142 that is slidably inserted beneath the container 124 on a pair of guide bars 144 secured to the side plates 134. The carried 142 includes a base 146, and a plurality of nests 148 secured to the base 146 that correspond to the number of molded parts to which the inserts 126 are ultimately transferred. As shown in FIGURE 4 each nest 148 includes four orifices 149 for receiving and retaining the inserts 126. To facilitate the exchange of inserts 126 from the nests 148 to the molded parts the carrier 142 includes a plurality of guide dowels 150 about each nest 148.

For transferring the inserts 126 from the orifices 140 in the container 124 to the orifices 149 in the carrier 142 without having the inserts 126 inadvertently falling out of the container orifices 140, there is provided a transfer mechanism 152 therebetween that includes a spring actuated transfer plate 154 and a spacer plate 156 which is a movable plate, the function of which is to remove the gap between the plate 154 and the nests 148. Both the transfer and spacer plates 154 and 156 are slidably connected to the container 124 and both contain the same number of orifices 158 therethrough as the orifices in the container 124 and carrier 142. However, until the carrier 142 is in place directly beneath the container 124 the transfer orifices 158 are offset from the orifices 140 in the container 124 as shown in FIGURE 6. The actuating mechanism for the plate 154 includes a pair of members 160, wherein one of the members 160 is secured to each side plate 134 rearwardly of the transfer plate 154 and in alignment therewith. Each member 160 includes a cylinder 162 closed by a cap 164, and a bore 166 through which extends a shaft 168 of a plunger 170 slidably mounted in said cylinder 162. The plunger shaft 168 extends forwarly from the member 160 and is secured to a member 172 depending from the rear of the transfer plate 154. Biased between the cap 164 and the plunger 170 is a spring 174 that constantly urges the plunger 170 forwardly to thereby normally maintain the transfer orifices 158 out of alignment with the orifices 140 in the container 124.

Extending through the bottom of the depending member 172 is an adjustable screw 176 adapted to be engaged by the carrier 142 as the latter slides along the guide bars 144. As shown in FIGURE 6, the carrier 142 engages the adjustable screw 176 when the carrier orifices 149 and transfer orifices 158 are in alignment. Thereafter the transfer plate 154 moves with the carrier 142 against the biasing action to the spring 174 until the transfer plate 154 abuts against the members 160. At such time the carrier transfer orifices 149 are in alignment with the orifices 140 in the container 124 whereupon the inserts 126 slide through the transfer and spacer plates 154 and 156 into the carrier nests 148.

For guiding the sliding movement of the transfer plate 154 the container bottom 138 includes a slot 178 therethrough adjacent each side thereof which has an axis parallel to the movement of the carrier 142. To limit wear a wearing member 180 is provided in a recess 182 in the upper portion of the container bottom 138 about each slot 178 and to prevent inserts 126 from falling into the slot 178 a movable cover plate 181 is provided which covers the slot 178 at all times. Extending through each cover plate 181 and corresponding slot 178 are a pair of spaced guide pins 184 threadably connected to the transfer plate 154. Accordingly, as the transfer plate 154 is moved by the carrier 142 against the biasing action of the spring 174, the guide pins 184 move along the slots 178.

In operation inserts 126, such as inserts $3/64$ of an inch in diameter and 1½ inches in length, are loaded in the container 124 which is 6 by 10 inches in dimension. At this point the orifices 158 in the transfer plate 154 are out of alignment with the container orifices 140 so that the container 124 will receive and retain inserts 126 induced thereinto. After the container 124 has been loaded with inserts 124 the drive 18 is actuated and reciprocates the container 124 ½ inch 200 times per minute. Concurrently, the vacuum machine withdraws air from the container recess 127 at the rate of 300 cubic feet per minute creating a pressure differential of 5 inches of mercury across the container orifices 140. The reciprocating movement of the container 124 causes the inserts 126 therein to move freely in a similar manner without influencing one another, and the sucking action through the container orifices 140 induces the freely moving inserts 126 thereinto. About 90% of the orifices 140 are filled within the first 2 or 3 seconds and the operation need only be continued for about 15 seconds. Moreover, as the orifices 140 are filled by the inserts 126 the increased sucking action through the unoccupied ones serves to further induce inserts 126 thereinto.

After the cycle is completed the drive 18 and the vacuum machine are stopped and the carried 142 is inserted sliding along the guide bars 144 until it engages the adjustable pin 176, whereupon further movement of the carrier 142 also moves the transfer plate 154 against the biasing action of the spring 174. When the transfer orifices 158 and carrier orifices 149 are in alignment with the container orifices 140 the inserts 126 simply drop through the transfer and spacer plate 154 and 156 into the carrier nests 148. The loaded carrier 142 is then removed and the inserts 126 retained therein are transferred to the molded parts by standard techniques.

The invention in its broader aspects is not limited to the specific embodiments herein shown and described but departures may be made therefrom within the scope of the accompanying claims, without departing from the principles of the invention and without sacrificing its chief advantages.

What is claimed is:

1. The method of orienting a number of randomly positioned relatively small articles, comprising filling a confined area with said articles wherein said area is positioned over a plurality of orifices for receiving and retaining said articles, rapidly reciprocating said randomly distributed articles over said orifices so that said articles freely move up and down within the confined area without hindering the movement of one another, simultaneously maintaining a flow of fluid through the orifices to induce the freely moving articles to enter into the same, and maintaining a carrier directly beneath said orifices throughout the entire operation so that said articles entering said orifices pass therethrough and, in turn, enter said carrier.

2. The method of orienting a number of randomly positioned relatively small articles, comprising filling a confined area with said articles wherein said area is positioned over a plurality of orifices for receiving and retaining said articles, rapidly reciprocating said randomly distributed articles over said orifices so that said articles freely move up and down within the confined area without hindering the movement of one another, simultaneously maintaining a flow of fluid through the orifices to induce the freely moving articles to enter into the same, maintaining a movable transfer plate directly beneath said orifices to prevent the articles entering said orifices from inadvertently falling out, and engaging said transfer plate with a carrier to move said transfer plate from beneath said orifices and cause said articles to enter said carrier.

3. The method set forth in claim 2 wherein the fluid is air and the flow of air through said orifices is effectuated by withdrawing air from the area directly beneath said orifices to thereby create a sucking action therethrough that induces the articles to enter the same.

4. The method set forth in claim 3 wherein the quantity of air withdrawn from the area directly beneath the orifices is constant throughout the operation to thereby increase the sucking action through the unoccupied orifices as the carrier becomes filled with said articles.

5. An automatic loading device for orienting randomly positioned relatively small articles, comprising a container for said randomly positioned articles having a bottom with a plurality of orifices therethrough arranged in the desired pattern for said inserts, a platform to which said container is pivotally mounted to and spaced over the front portion thereof to form a recess between said container and said platform, a carrier having a plurality of orifices which are also arranged in the desired pattern for said inserts insertable in said recess to align said carrier orifices with said container orifices, locking means on said container and cooperating with said platform to secure the container and carrier in position, reciprocating means secured to the platform below said container for rapidly reciprocating said container to cause said articles to freely move up and down in said container and over said container orifices without hindering the movement of one another, and vacuum means communicating with said carrier orifices and with the interior of said container through said container orifices for creating pressure differential across said orifices wherein the pressure above said orifices is greater than the pressure below said orifices to induce freely moving articles within said container to pass through said container oriifices and pass into said carrier orifices.

6. The automatic loading device set forth in claim 5, comprising guide pins depending from said container bottom, and recesses in said carrier corresponding to said guide pins which receive said pins when said container is spaced over the front portion of said platform to insure proper alignment between said container and carrier orifices.

7. The automatic loading device set forth in claim 5 wherein said vacuum means withdraws air from directly beneath said carrier orifices to thereby create the pressure differential across said container and carrier orifices.

8. The automatic loading device set forth in claim 7 wherein the quantity of air withdrawn from directly beneath said carrier orifices is constant throughout the operating cycle.

9. An automatic loading device for orienting randomly positioned relatively small articles, comprising a container for said articles having a bottom with a plurality of orifices for temporarily receiving and retaining said articles, reciprocating means connected to said container for rapidly reciprocating said container to cause said articles to rapidly and freely move up and down within said container without hindering the movement of one another, means operatively connected to said container which maintains a flow of fluid through said container orifices to induce the freely moving articles to enter thereinto, a spring actuated transfer mechanism including a plate below said container in slidable contact with said bottom and having a plurality of transfer orifices normally maintained out of alignment with said container orifices to permit the temporary receiving and retention of articles by said container orifices, and a carrier having a plurality of orifices for receiving and retaining said inserts from said container orifices slidable beneath said container to engage said transfer plate and to move said plate therewith until the container orifices, transfer orifices and carrier orifices are in alignment, whereupon said inserts in said container orifices pass through said transfer orifices and are received and retained by said carrier orifices.

10. The automatic loading device set forth in claim 9 wherein said fluid means withdraws air from directly beneath the orifices in said container to thereby create said pressure differential across said orifices to induce the freely moving articles to enter into the same.

11. The automatic loading device set forth in claim 10 wherein the quantity of air withdrawn from directly beneath said container orifices is constant throughout the operating cycle so that as the orifices become filled with articles the sucking action through the unoccupied orifices increases to thereby further induce the freely moving articles to enter the unoccupied orifices.

12. The automatic loading device set forth in claim 9 wherein the container has a guide for the sliding moving of said transfer plate, comprising a pair of opposing guide slots in said container having axes parallel to the movement of said carrier, movable cover plates which extend over each slot at all times to prevent the articles from falling into said slots, and guide pins extending through and connected to said movable cover plates and slidably extending through said slots and connected to said transfer plate wherein movement of said transfer plate caused by said carrier is guided by said guide pins moving with said cover and transfer plates and slidably moving in said slots for proper alignment of said container, transfer and carrier orifices.

References Cited

UNITED STATES PATENTS 2,833,091   5/1958   Whitney _____ 53—126 X
2,920,740   1/1960   Whitted _____ 198—33

EDWARD A. SROKA, *Primary Examiner.*

U.S. Cl. X.R.

221—204, 211